May 21, 1946.     R. CHILTON     2,400,536
TRANSMISSION
Filed Oct. 14, 1942     5 Sheets-Sheet 1
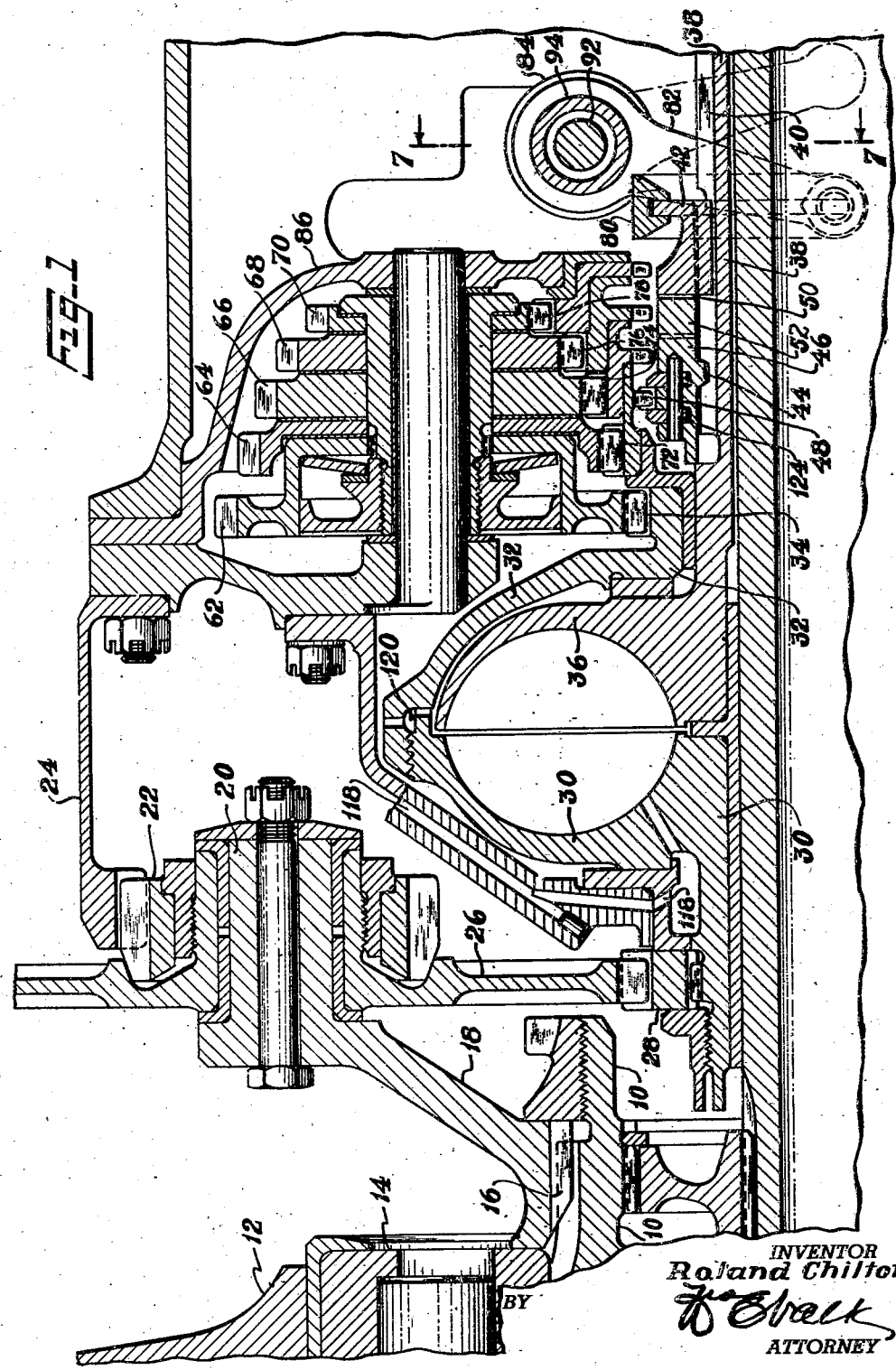
INVENTOR
Roland Chilton
BY
ATTORNEY

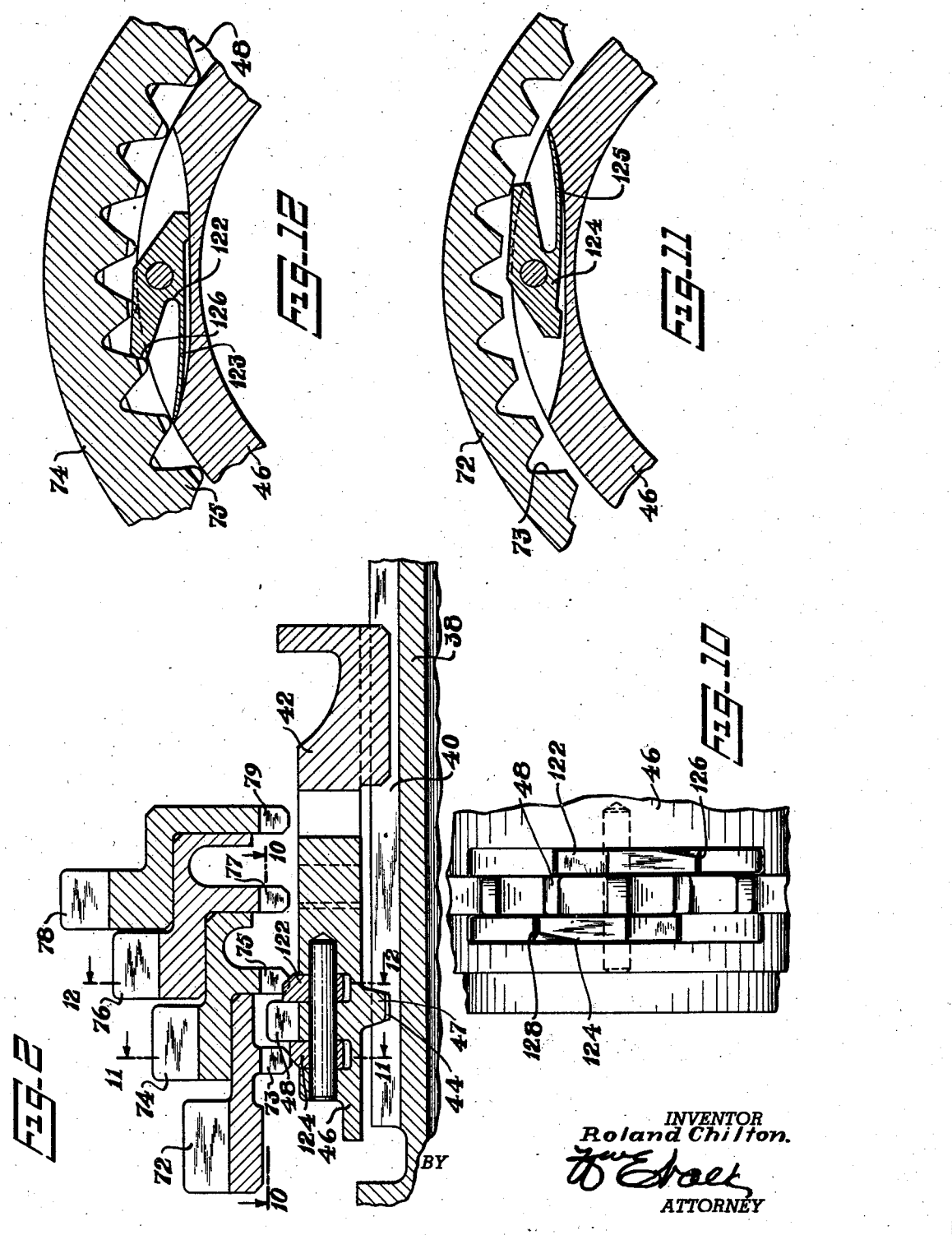

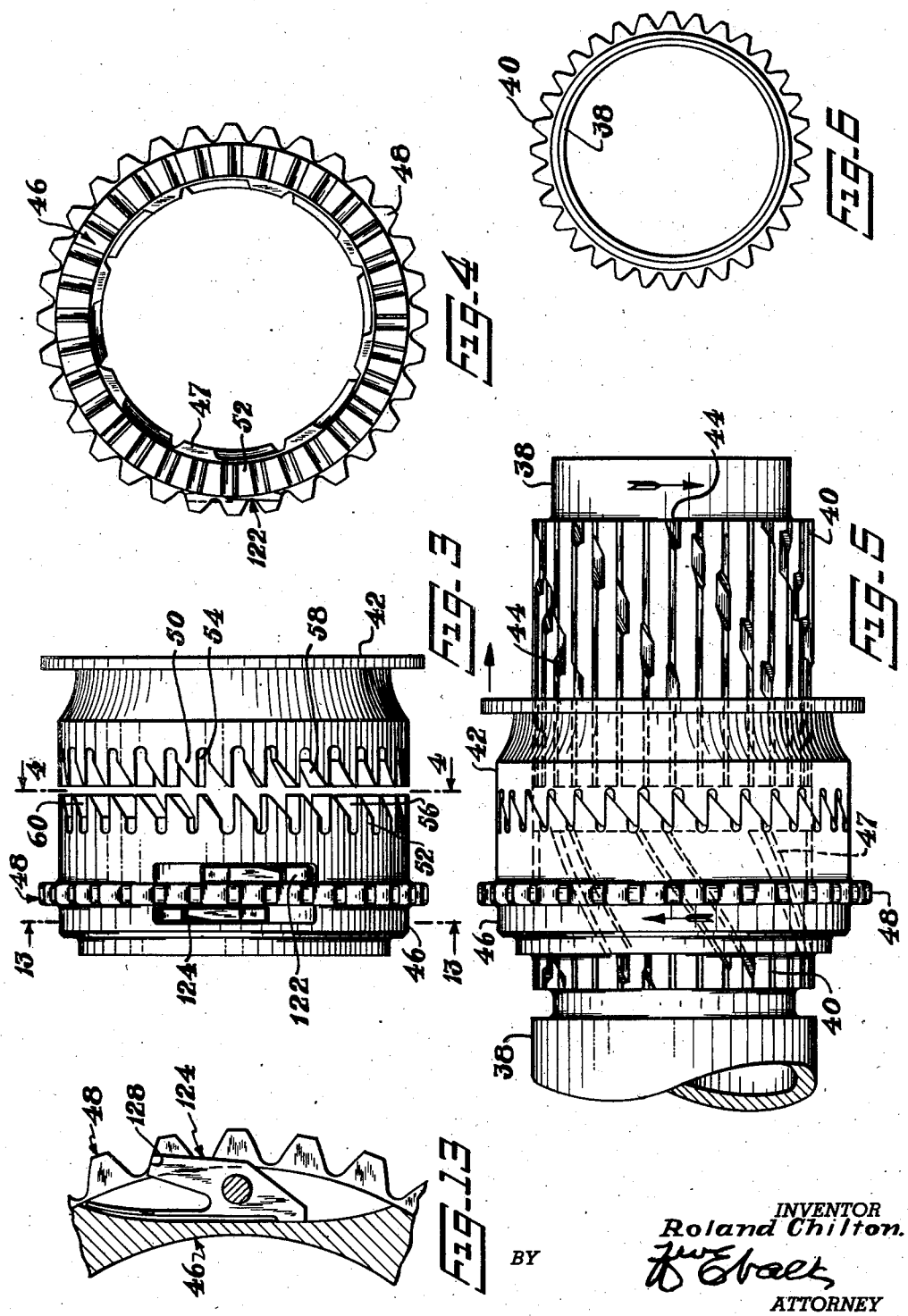

May 21, 1946.   R. CHILTON   2,400,536
TRANSMISSION
Filed Oct. 14, 1942   5 Sheets-Sheet 4
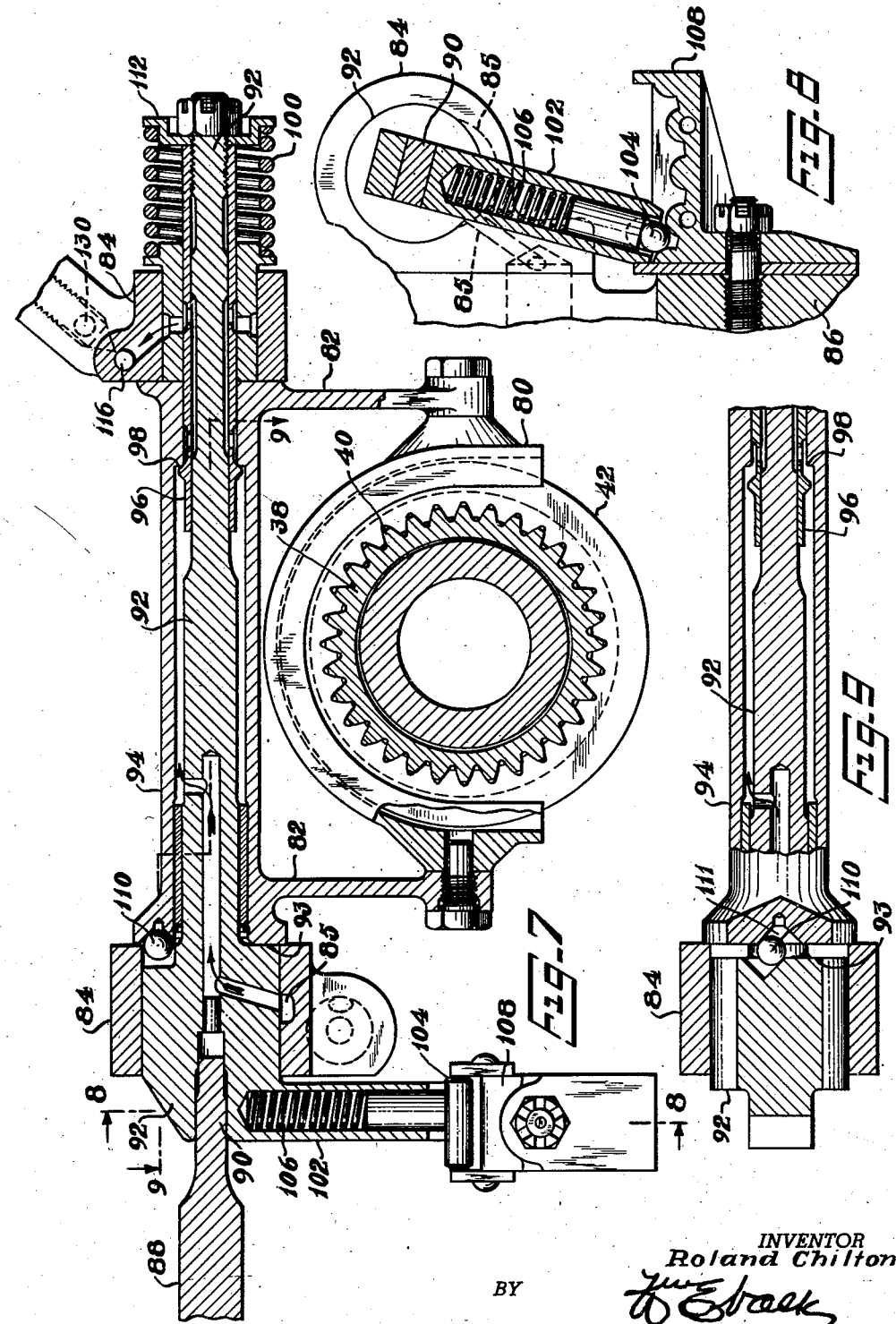
INVENTOR
Roland Chilton.
BY
ATTORNEY Patented May 21, 1946

2,400,536

UNITED STATES PATENT OFFICE 2,400,536

TRANSMISSION

Roland Chilton, Ridgewood, N. J., assignor to Wright Aeronautical Corporation, a corporation of New York Application October 14, 1942, Serial No. 462,059

44 Claims. (Cl. 74—189.5)

This invention relates to gear shift mechanisms in general and is useful wherever multiple torque and speed ratios are desired for the transmission of power between driving and driven shafts.

As will appear later, one feature of the invention is that the new concept is applicable to a great number of speeds or gear shift stations by the mere addition of closely spaced gears without other change in the main operating elements which of themselves are adapted to any desired number of speeds. In the specific embodiment chosen for illustration, the driving or input shaft is the slow speed member; the various gear stations affording different speed-up ratios to the driven shaft which, in this case, drives a supercharger impeller. It will be obvious, however, that the high speed shaft could be used as the driving member for use as a reduction gear of various ratios.

One of the prime features of the invention resides in a new disposition and function for a friction clutch or conventional controllable fluid coupling (the latter being shown in the drawings). This is best explained by comparison with conventional gear shift systems, as in automobiles, wherein a normally engaged clutch in series with the gears is used to disconnect them from the power source for shifting, thus interrupting the flow of power until the clutch is re-engaged upon completion of the shift. According to the present invention, a normally disengaged coupling in parallel with the gears, is temporarily engaged to transmit the torque directly from the driving shaft to the driven shaft to thus relieve the gears of torque and to synchronize them for shifting, whereby there is no disconnection of the power source from the driven member, and driving torque is maintained during the shift. This new disposition and function of the main clutch or torque-coupling results in a new mode of operation having far reaching advantages which lead to substantial simplification in structure and operation of multiple speed gears as will be pointed out in, or will be obvious from, the following description.

Another novel feature of the invention resides in the provision of an especially compact gear shift organization wherein a plurality of coaxial toothed rings are arranged in a closely spaced series comprising a desired number of gear shift stations, each ring being driven at a different speed by a plurality of constant-mesh layshaft gears. To disengage and engage respective tooth rings to form a positive toothed-clutch drive, a helically mounted and axially shiftable toothed collar is provided. Movement of the collar is automatically responsive to the energization of the torque-coupling which is controlled by novel means; first to bring the toothed coupling to zero torque for disengagement, and then to effect synchronization for automatic engagement of the next gear ratio, whereupon the fluid (or other) coupling is automatically de-energized by control interconnections.

I am aware that transmissions which shift automatically in response to changes in speed or torque between the driving and driven shafts are old in the art, as in (two-speed) throttle-responsive automobile over-drives. The present invention includes a new and improved speed-responsive gear shift mechanism applicable to any number of speeds and is also usable where the shift is affected by cutting the driving power, as by shutting off the ignition or throttle. However, a further and important feature of the present invention resides in the use of a normally disengaged coupling engageable to enforce the speed and torque changes which produce the automatic shift without interrupting the power flow and without operating any throttle, ignition or other interconnection with the power means. In this system, all these functions are self-contained within the transmission unit itself and operate independently of any change in speed or power output of the driving means.

I am also aware that ratchet operated screw-shift means, responsive to changes in relative speed and/or torque direction are old in the art, but the means herein disclosed is a novel and simplified structure suitable to any number of speeds, in accordance with certain of the objects of the invention.

In the drawings:

Fig. 1 is an axial section through a four-speed embodiment designed for a supercharger drive;

Fig. 2 is an enlarged fragmentary axial section of the shift elements;

Fig. 3 is an outside view of the shift collars;

Fig. 4 is a view taken along the line 4—4 of Fig. 3;

Fig. 5 is an outside view of the shift collars on their shaft;

Fig. 6 is an end view of the driven shaft;

Fig. 7 is an end view in section on the line 7—7 of Fig. 1 through the control mechanism;

Fig. 8 is a sectional view of the control locking detent along the line 8—8 of Fig. 6;

Fig. 9 is a section on the line 9—9 of Fig. 7;

Fig. 10 is an enlarged view on the line 10—10 of Fig. 2; and

Figure 7A:
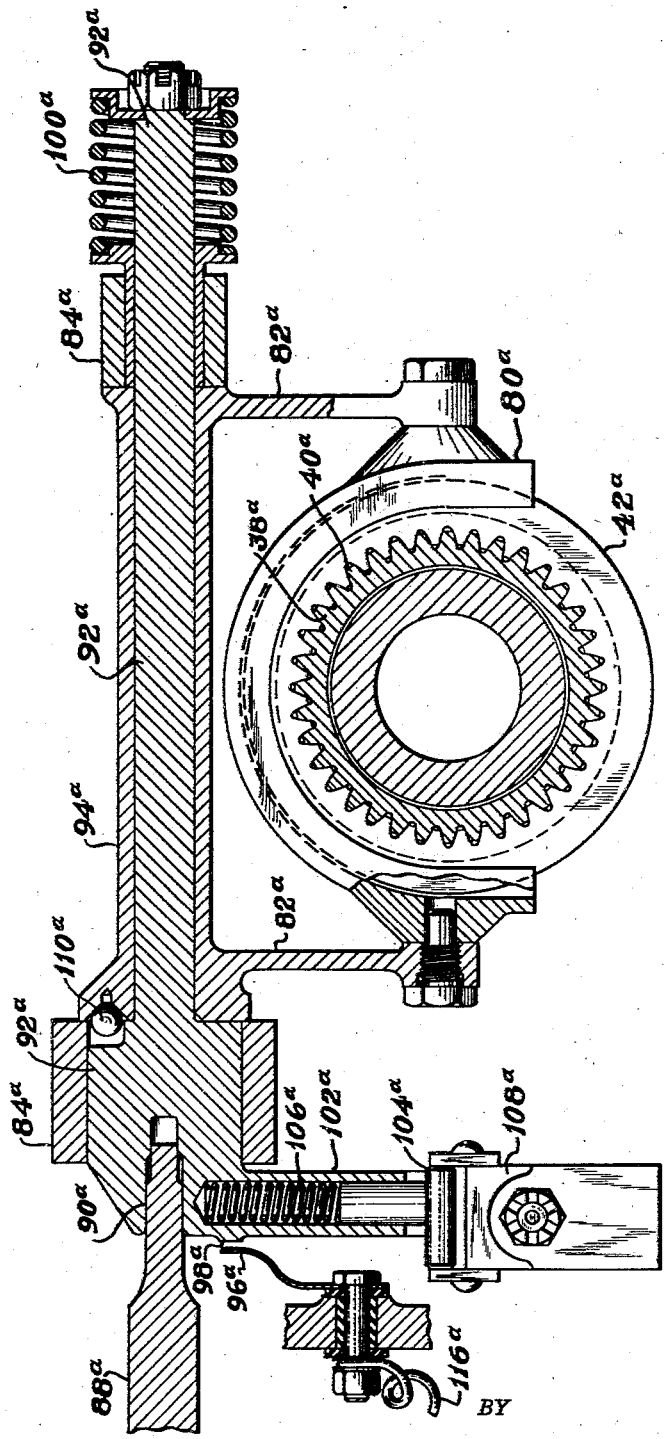
Fig. 7A is an end view, similar to Fig. 7, of a modification.

Figs. 11, 12, and 13 are sectional views, respectively, on lines 11—11, 12—12 of Fig. 2, and line 13—13 of Fig. 3.

Referring first to Fig. 1, 10 designates an engine crankshaft mounted in a crankcase 12 on bearings such as indicated at 14. Splined at 16 to the crankshaft 10 is a planet carrier 18 having journals 20 on which are mounted planet pinions 22 engaging a fixed ring gear 24, and planet gears 26 meshed with a sun gear 28 rigid with the left hand half of a conventional fluid coupling housing 30.

A coupling cover 32 is rigid with the housing 30 and carries a gear 34. By the parts so far described, the coupling housing 30 is at all times driven at somewhat higher speed ratio (in this case nine times engine speed) than the highest speed ratio provided by the gear shift mechanism (in this case seven times engine speed). The coupling 30 has a runner 36 shown integral with a driven shaft 38, seen in enlarged detail in Figs. 2 to 6. The runner-driven shaft 38 is equipped with axial driving splines 40 (Figs. 5 and 6) on which a locking collar 42 is splined and free to slide. Cut on top of the driving splines 40 are helical grooves 44 on which is freely splined a toothed clutch ring 46 having helical splines 47 and clutch teeth 48. The collar 42 and ring 46 have mating end jaws 50 and 52, best seen in Fig. 3.

The jaws 50 and 52 have axial driving faces 54 and 56 and helical backs 58 and 60 having the same lead of helix as the helical shifting splines 44. In this specific instance, the lead is, for example, 12", and there are thirty-two of the jaws 50 and 52 so that rotation of the helically mounted collar 46 by the amount of one tooth results in an axial motion of $12/32 = 3/8''$. This axial movement of $3/8''$ is the same as the spacing of the various gear stations later to be described.

Now suppose that jaws 50 and 52 be fully engaged as shown in Figs. 1 and 5. In these circumstances it will be clear that the ring 46 is locked against rotation in the direction of its associated arrow (Fig. 5) by the engaging axial faces 54 and 56, remembering that the driving splines 40 of the locking collar 42 are also axial. However, it will also be seen that, should the toothed ring 46 be rotated against the direction of its associated arrow, it will move leftwardly (Figs. 1 and 5) along the helical splines 44 without movement of the collar 42, because the helical lead of the backs 58 and 60 of the jaws is the same as that of the helical splines 44. In other words, if a light leftward pressure be put on the locking collar 42 during this clockwise rotation of the toothed ring 46, as viewed from the left of Fig. 5, the collar 42 will not move until such rotation has brought the jaws point-to-point, whereupon the locking collar 42 will snap to the left by suitable spring means hereinafter described, re-engaging the parts one tooth circumferentially and (in this instance) $3/8''$ axially from the original position.

To complete this preliminary explanation of the coaction of collar 42 and ring 46, suppose that a substantial torque is imposed on the axial faces 54 and 56 by attempting to rotate the toothed ring 46 and the locking collar 42 in the directions of their respective arrows (Fig. 5), while a light axial pressure to the right is exerted against the locking collar 42. Under these circumstances, the locking collar 42 will not move to the right, because of the driving friction on the jaw faces 54 and 56 and axial splines 40, but if the torque be gradually relaxed, there will arrive a point (called "zero" torque) where the locking collar 42 will snap to the right, out of engagement, and assume the position shown in Fig. 3. Actually, the movement of the locking collar 42 is normally limited by the control mechanism, later to be described, to be only $3/8''$ for each shift increment so that the right hand movement will bring the jaws 50 and 52 to clear. If now the torque is again applied in the direction of the arrows (Fig. 5), it will be seen that the toothed ring 46 will advance to the right until it is arrested by full re-engagement of the jaws 50 and 52, the ring having again rotated one jaw spacing ($1/32$ of a turn) on its helical splines and advanced to the right $3/8''$ to the next gear ratio station. The operations just described represent the functioning of the novel shift system of this invention but, in the actual operation, the forces above represented as mere manipulation are provided by the admission of working fluid (oil) to the fluid coupling 30 and 36 and subsequent automatic cut-off responsive to the resulting motions of the locking collar 42 by inter-connected control means, later to be described.

Before describing the control means, a description of the gearing which provides the various ratio stations should be given. The gear 34 previously stated to be rigid with the coupling housing 32 and rotating, in this case, at nine times engine speed, is engaged by a plurality of surrounding layshaft gears 62 which carry with them in their rotation the gears 64, 66, 68 and 70 (four of them as this is a four-speed transmission). Four gears 72, 74, 76, and 78 are meshed with the respective layshaft gears and each of these gears has a similar internal clutch teeth 73, 75, 77, 79 (Fig. 2) spaced axially one shift-increment ($3/8''$) apart, and these teeth are serially engageable by the teeth 48 of the toothed ring 46, thus providing a different driven speed for engagement with each respective sun gear. The gear 64 and its ring gear 72, when engaged, provide the high speed gear drive of the driven shaft 38 equal to seven times engine speed. The remaining gears 66, 68 and 70, when engaged, provide successively lower speed ratios. Therefore, since the fluid coupling housing 30 is designed to rotate at nine times engine speed, the driven shaft 38 can be driven by the fluid coupling through a speed range greater than that available from the gears 64, 66, 68 and 70.

As used in the specification and claims, the term "up-shift" refers to a speed-ratio change of the transmission increasing the speed of the driven shaft 38 and the term "down-shift" refers to a transmission speed-ratio change decreasing the speed of this shaft.

As illustrated, the ring gears 72, 74, 76 and 78 are nested together for relative rotation and each of these gears is supported and centralized by equal reaction from a plurality of layshaft gears, thus relieving the ring gears of all side load. This is in contradistinction to the usual single layshaft arrangement wherein each ring gear would have to be individually supported on a wide and rigid bearing structure capable of locating and supporting the gear against the entire driving load on the ring gear teeth. This usual construction would prohibit the close spacing of the ring gears 72, 74, 76 and 78 and their clutch teeth 73, 75, 77 and 79, and the bearing structure for the ring gears would interfere with the movement of the shift members 42 and 46 through the entire series of ring gears. In short, as disclosed, the entire supporting structure for all of the speed change ring gears is virtually within the range of travel of the shift members. This extreme compactness is one feature of the present invention. With this arrangement additional gear ratios may be added without changing the details of construction of the shift membears 42 and 46 which is inherently suited to any number of gear ratios desired. The nested construction of the ring gears 72, 74, 76 and 78, as illustrated in the drawings, provides auxiliary bearing support for these gears but this auxiliary support of itself might be incapable of sustaining the tooth loads if but a single layshaft were used.

The gear-shifting control, it will be noted, is through the locking collar 42 which in turn is operated by a draw-collar 80 such as that shown in Figs. 1 and 7. The collar 80 is moved axially by rocking a fork-lever 82 mounted in suitable bearings 84 in a housing 86 (Fig. 1), in which the layshaft gears are also mounted. The operator's control is by a primary control shaft 88 which has a tongue connection 90 with a shaft 92 passing through the hub 94 of the fork lever 82 and operating a coupling-oil control valve 96 as follows: The valve 96 (Fig. 7) cooperates with a seat 98 formed in the lever hub 94 and is normally kept tightly seated by right hand pressure from a spring 100. The shaft 92 has a rigid dependent lever 102 at its left hand end and this lever 102 has a detent 104 loaded downwardly by a spring 106 against a four notch detent rack 108 (see also Fig. 8) secured to the housing 86. The spacing of the notches in the rack 108 is such as to arrest the draw-collar 80 and locking collar 42 at ⅜" intervals to correspond to each gear station.

Motion from the control shaft 92 is transmitted to the fork lever 82 through the action of balls 110 engaging circumferentially spaced conical pockets 111 formed in the end of the lever hub 94 (Fig. 9) and in the opposed shoulder 93 of the control shaft 92, respectively. It will be seen that the valve 96 has an extension 112 where it is threaded on the right hand end of the control shaft 92 whereby the parts are adjusted axially during assembly so that there is very slight rotational clearance at the balls 110 while the spring 100 holds the valve 96 firmly on its seat. It will further be seen that, should the prime operator's control 88 be moved to throw the spring detent 104 into the next notch, the control shaft 92 must move equally, but should there be resistance to the motion of the draw-collar 80, the control lever 82 will remain stationary, whereupon the action of the balls 110 in their conical pockets will draw the control shaft 92 bodily to the left against the bias of spring 100 and open the coupling-oil valve 96 (as shown in Fig. 9). The bias of spring 100 will be transmitted through the shoulder 93 of shaft 92 to the balls 110 in their conical pockets, as illustrated in Fig. 9, and the reaction of balls 110 against the conical walls of these pockets is transmitted through lever 82 and collar 80 to provide a light axial shifting pressure on collar 42. Oil pressure is at all times supplied to the left bearing 84 at 85 and thus to the lefthand side of the valve 96 (see arrows), the oil being normally shut off at this point. When the valve is opened, however, the oil proceeds to the righthand bearing 84 of the control shaft and through a duct 116 which communicates with the coupling 30, 36 as seen at 118 in Fig. 1. This fluid coupling has a bleed orifice 120 at its periphery whereby it normally runs empty, but the rate of oil flow when the valve 96 is open is sufficient to progressively fill the coupling in spite of this bleed at the hole 120.

It is important to note that the locking collar 42 is limited to axial motion (no relative rotation on the axial driven shaft splines 40) and that no matter what axial pressure should be put on the locking ring 42, it cannot of itself move the toothed ring 46. Leftward pressure merely locks this ring upon its helical splines while righthand pressure will result in righthand movement of the locking collar 42 alone when the force resulting from the control spring 100 and balls 110 is sufficient to overcome the driving friction at the axial jaw faces 54 and 56 and at the splines 40. The shifting pressure available at the collar 42 from the spring 100 is deliberately made of small value so that the collar 42 will not follow righthand urging from the control until the torque load on the jaws and splines is virtually zero whereupon the action of the spring 100 and balls 110 is to re-aline the conical pockets 111 thereby snapping the collar smartly one increment to the right, thus instantly closing the valve 96 and promptly cutting off the oil supply to the fluid coupling 30, 36 which then proceeds to drain through the bleed hole 120, whereby the driven shaft slows down until the jaws 50 and 52 are reengaged and the drive resumed by the next lower gear.

Recapitulating this action, it will be noted that the action of the balls 110 in opening the valve 96 is the same for either direction of motion of the control lever, i. e., whether it be moved to initiate a shift to a higher ratio station or to a lower. It is also repeated that in operation (with driving load on the parts) the locking collar 42 will not immediately follow the motion of the control shaft but will remain stationary whereby the first effect of moving the control lever one notch is merely to open the valve 96 thereby starting admission of oil to the coupling while maintaining a light axial pressure on the collar 42 which is prevented from responding by the driving torque load. Also, any leftward pressure on the collar merely locks the ring 46 on its helical splines. However, as the coupling fills, more and more of the torque is taken off the jaws 50 and 52 by the fluid coupling (bearing in mind that the driving member of the coupling is always running faster than the driven member). In other words, as the coupling fills, the gears in use are progressively relieved of torque until the instant when all of the drive is taken through the coupling at which instant the driven shaft 38 will start to overrun the gear in use. This results in the toothed ring 46 starting to wind itself leftwardly along its helical splines 44. Now, should the light spring pressure of the shift collar 80 on the locking collar 42 be to the right, i. e., should a shift to the lower speed have been initiated, the collar will instantly snap to the right, restoring the valve 96 to its closed position and cutting off the coupling oil. The coupling then proceeds to drain, allowing the speed of the driven shaft to fall, during which time the toothed ring 46 will wind itself along its helical spline as hereinafter described, until it re-engages the collar which has moved its ⅜" increment as previously described. Thus, on a shift "down," the oil supply to the coupling is cut instantly zero torque is reached thereby allowing the speed of the driven shaft to fall and permit the clutch teeth to mesh with the clutch teeth on the next lower drive-ratio gear upon speed synchronism therewith.

For a shift up, requirements are different, and herein resides one important feature of the invention. It is now necessary, since the coupling must speed up the driven shaft, that the oil supply to the coupling continue after the zero torque point has been reached and until the driven shaft has been speeded up to the required amount, i. e., until speed synchronism has been attained between ring clutch teeth 48 and the clutch teeth of the next higher drive-ratio gear. The special construction of the jaws 50 and 52 provides for this, as already described, because when rotated clockwise, as viewed from the left of Figs. 1 and 5, the toothed ring 46 moves one complete shift increment to the left without any motion of the locking collar 42, whereby the valve 96 stays open until the points of the jaws are reached and the collar snaps into the toothed ring 46 and locks it, at which instant the oil supply to the coupling is cut off, and the coupling drains through its bleed hole 120 and the torque again devolves on the gear system to the driven shaft 38 through the toothed ring 46, locking collar 42 and their engaged jaws, all as previously described.

The action of the toothed ring 46 in winding up and down its helical splines is controlled exclusively through oppositely extending pawls 122 and 124 pivoted on either side of the teeth 48 of the ring 46, better seen in the enlarged views of Figs. 2, 10, 11, 12, and 13. These pawls are outwardly biased by resilient fingers 123 and 125. When the teeth 48 are at any one gear station, i. e., engaged with the mating teeth of one of the sun gears, the pawls are clear of adjacent sun gear clutch teeth, as shown in Fig. 1. However, as seen in Fig. 2, when the tooth ring 46 is in process of shift, i. e., in "neutral" between two stations, then the pawls 122 and 124 engage and have opposite one-way ratchet actions with the respective adjacent sun gear clutch teeth. Under this condition, the toothed ring 46 will be automatically moved along its helical mounting spline into engagement with whichever adjacent sun gear it should next be synchronized with in speed. Thus, if we imagine the toothed ring 46 in any one neutral position and the fluid coupling 30, 36 as still filling, the latter will be accelerating the driven shaft 38 towards synchronism with the next higher gear which will be engaged automatically by teeth 48 of ring 46 when synchronism is reached as a result of the action of pawl 124 and the helix. Conversely, should the coupling be emptying, the shaft will be decelerating and when synchronism is reached with the adjacent lower speed sun gear, the toothed ring 46 will be drawn along its helical spline into engagement with this adjacent lower speed sun gear teeth by the automatic action of the pawl 122 and the helix. It should be noted that the engaging ends 126 and 128 of the pawls 122 and 124, respectively, are in alinement with the face of a clutch tooth 48 as best seen in Figs. 12 and 13. This construction insures alinement of ring clutch teeth 46 and the desired clutch teeth 73, 75, 77 or 79 as the pawl 122 or 124 operates to bring these teeth into mesh.

The shift action of the pawls 122 and 124 may be summarized as follows: With the toothed clutch ring 46 in neutral between ring gears 72 and 74, as illustrated in Fig. 2, the rotative speed of the clutch ring 46 is intermediate the speed of the 4th speed gear 72 and the speed of the 3rd speed gear 74 and, therefore, the faster gear 72 is overrunning the pawl 124 and the pawl 122 is overrunning the slower gear 74. In the case of an upshift, the driven shaft 38 and clutch ring 46 are accelerating and as soon as the speed of the driven shaft 38 begins to exceed that of the ring gear 72 the pawl 124 engages the clutch teeth 73 and this co-action between the pawl 124 and the clutch teeth 73 of the ring gear 72 will advance the clutch ring 46 along its helical splines to bring clutch teeth 48 and 73 into engagement. Similarly in the case of a down-shift, the shaft 38 and clutch ring 46 are decelerating and as soon as the speed of the shaft starts to drop below that of the ring gear 74 the co-action between the pawl 122 and the clutch teeth 75 of the gear 74 will retract the clutch ring along its helical splines to bring its clutch teeth 48 into engagement with clutch teeth 75 of gear 74. Thus, in the case of both an up-shift and a down-shift, a slight momentary reversal of the relative speed of the screw-shift shaft and gear to be engaged is necessary for screwing the clutch ring into engagement with the gear. The magnitude of this momentary reversal is very slight. In applicant's specific disclosure the clutch ring 46 is provided with 32 locking jaws so that the clutch ring 46 rotates 1/32 of a revolution relative to the shaft 38 upon shift movement along its helical splines from an adjacent gear. Half of this relative rotation takes place as the clutch ring shifts into its neutral position. Therefore, with the clutch ring in its neutral position, as the shaft 38 begins to overrun the gear to be engaged in the case of an upshift, or to underrun the gear to be engaged in the case of a down-shift, complete engagement of the clutch teeth 48 is effected in the next 1/64 of a revolution of relative rotation of the shaft 38 and the gear being engaged. Except for possible slight backlash between the pawls 122 or 124 and the clutch teeth of the ring gear to be engaged, these pawls begin to screw the clutch ring 46 into mesh with the ring gear to be engaged the moment the shaft 38 and the clutch ring 46 arrive at speed synchronism therewith.

In brief, when the control shaft lever 102 is thrown to an adjacent lower speed notch, the locking collar 42 does not immediately follow, whereby relative motion at the balls 110 opens the valve 96 and starts to fill the coupling. When sufficient oil has entered the coupling to enable it to relieve the gear system of driving torque, then the locking collar snaps to the right shutting off the oil supply. In case of a shift to a higher ratio, the locking collar 42 does not move until the shift is complete, i. e., until the tooth ring 46 has attained synchronization with and fully engaged the new gear at which time the jaws 52 of ring 46 have advanced one spacing and the spring 100 snaps the locking collar jaws 50 into re-engagement, thus shutting off the oil supply. It is important to keep in mind that the locking collar 42 does not shift the toothed ring 46. It merely anticipates or follows up the shifting of this ring which results from the helical splines and ratchets as the gears are brought to zero torque and synchronized to their new speed ratio by the automatically controlled emptying of the coupling, which is responsive to the movement of the locking collar 42 cutting the oil supply at the different phases of the shift as required for up-shift and down-shift respectively.

The rate of filling of the coupling and, therefore, the time taken in shifting is adjustable by means of a needle valve 130 (Fig. 7) in the coupling oil passage 116. Should this valve be set wide open, the coupling will fill rapidly and the sequence of actions described at length may be completed in a fraction of a second. On the other hand, if slower completion of the shift is desirable, the bleed valve 130 may be adjusted accordingly.

In this example, the slipping-clutch means, by which the gears are relieved of torque and whereby synchronization with the new ratio is achieved, has been described as a fluid coupling. The invention, however, is not limited to this type of slip coupling or slip clutch. For example, a friction clutch loaded by centrifugal force of oil behind a piston may be used, the oil quantity being automatically controlled in the same way as described in the case of the fluid coupling.

While the drawings show four speeds, it will be seen that additional ratio stations require merely additional layshaft gears and sun gears and additional notches in the detent rack 108; the fluid coupling, the tooth ring 46, the collar 42, and the control mechanism and other parts remaining unchanged. It will also be seen that this invention provides a simple shift system where the clutching, synchronizing and gear shifting functions are all automatically correlated in simple unitary mechanism having a single-lever control. This is in contra-distinction to conventional automobile gear shifts, for instance, where a shift lever, an engine throttle lever and a clutch lever have to be properly coordinated by the operator. It will also be seen that in this system the torque to the driven member is continuous even during the shifting instead of the power means being completely disconnected during each shift. It is also pointed out that the fluid or other coupling is working only at time of shift (say one second more or less). It does no work during normal running when it is empty, in the case of the fluid coupling, or completely disengaged in case a friction clutch is used. All these results are in conformity with objects of the invention.

As used in the specification and claims, a coupling of any type which has been rendered ineffective to transmit torque has been described as "disengaged" or "unloaded" and conversely the coupling is "engaged" or "loaded" when it has been rendered effective to transmit torque.

In Fig. 7A there is disclosed a modification of the control mechanism for use with the novel screw shift mechanism and in which the shift is effected by cutting off the driving power, i. e., by shutting off the ignition as illustrated in Fig. 7A or by shutting off the engine throttle. The control mechanism of Fig. 7A is quite similar to that of Fig. 7 and similar or analogous parts have been designated by the same reference numeral with the addition of a subscript $a$. The primary distinction of this modification is that the fluid coupling 30 and its control valve 96 are eliminated and an ignition switch 96a is substituted for the fluid valve 96. When control handle 88a is operated in either direction, spring 100a through balls 110a and their conical seats imposes a light shifting pressure in the appropriate direction on locking collar 42a through lever 82a. At the same time the balls 110a draw the control shaft 92a to the left to close switch 96a to thereby short circuit a conventional magneto ignition system. This operation of the control mechanism to open and close switch 96a is similar to the operation of the control mechanism of Fig. 7 to close and open valve 96. Switch 96a when closed grounds magneto primary wire 128a at contact 98a to shut off the ignition and slow down the engine.

Now, suppose it is desired to effect an upshift; control handle 88a is operated to impose a leftward pressure on locking collar 42a and at the same time this operation of the handle 88a closes switch 96a to shut off the ignition. The engine will slow down until the gear driving torque is substantially zero and after which point the further decreasing engine speed will shift ring 46 into mesh with the clutch teeth of the next higher gear ratio through the action of pawls 124 and helix 44, just as previously described. Locking collar 42a will then snap to the left, and spring 100a will restore switch 96a to its normal open position to again render the ignition effective. Similarly, to effect a downshift, control handle 88a is operated to impose a light rightward pressure on locking collar 42a and at the same time this operation of handle 88a closes switch 96a to shut off the ignition and slow down the engine. As soon as the gear driving torque is substantially zero, locking collar 42a will snap one gear station to the right and spring 100a will immediately return switch 96a to its normally open position to again render the ignition effective and accelerate the engine. The acceleration of the engine will shift ring 46 to the right into engagement with the next lower gear ratio through the action of pawls 122 and helix 44, as previously described in connection with Fig. 7. Obviously, the above control for decelerating and accelerating the engine to effect the shifting operation, could be accomplished just as well by a control of the engine throttle instead of the ignition.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission, in combination, a shaft having axial splines and helical splines thereon of lead "L," a toothed clutch ring having "N" jaws and engaging said helical splines, a locking ring having corresponding jaws and slidable on said axial splines to drivably lock said toothed clutch at $$\frac{L}{N}$$

intervals along said shaft, a plurality of gear rings having clutch teeth axially spaced at $$\frac{L}{N}$$

intervals for selective engagement by said clutch ring teeth, and means to drive said gear rings at different relative speeds.

2. In combination, a pair of rings having mutually engageable jaws, one ring having clutch teeth and helical shifting splines and the other ring having axial driving splines, a drive transmitting member having corresponding helical and axial splines engaging respective rings whereby the rings may be locked at stations along the drive member spaced by the lead of said helix divided by the number of jaws, and gear rings having different relative speeds and furnished with clutch teeth engageable by the first said clutch teeth at the respective stations.

3. In combination, a pair of rings having mutually engageable jaws, one ring having clutch teeth and helical shifting splines and the other ring having axial driving splines, a drive transmitting member having corresponding helical and axial splines engaging respective rings whereby the rings may be locked at stations along said drive member spaced by the lead of said helix divided by the number of jaws, gear rings having different relative speeds and furnished with clutch teeth engageable by the first said clutch teeth at the respective stations upon speed synchronization therewith, a normally unloaded coupling loadable to effect said speed synchronization, and a control including means elastically yieldable to urge said locking ring up and down said drive member and means to load said coupling responsively to said elastic yield and to unload the coupling responsively to recovery of said elastic means.

4. In combination, a driving member, a driven member, a plurality of coaxial gear rings each having similar clutch teeth and providing a plurality of drive ratios between said members, one of said members being concentric with said gear rings and having a helical spline, a toothed clutch member mounted on said helix and having a screw-shift meshing action with successive gear rings responsive to relative acceleration and deceleration of said driving and driven members, a normally disengaged coupling controllably engageable to produce said acceleration and deceleration, and automatic means responsive to the shift action to disengage said coupling.

5. In combination, a shaft having screw means, a normally unloaded slip-coupling loadable to drive said shaft to different speed ratios, a plurality of gears comprising spaced tooth clutches of different speed ratios, a tooth clutch member having screw-shift coaction between said shaft and gear clutch teeth, and control means to initiate loading of said slip coupling, said control means including automatic means responsive to the resulting screw-shift action to unload said coupling.

6. A transmission including in combination a driving member, a driven member, a plurality of coaxial ring gears having similar clutch teeth, each providing a different drive ratio between said members, a toothed clutch ring helically mounted on one of said members for screw-shift coaction up and down relative to said gears responsively to relative acceleration and deceleration of said members, a coupling loadable to effect said acceleration, control means adapted to start said loading upon movement for up or down shift and including means to unload said coupling responsively to the completion of an up-shift but responsively to the start of a down-shift.

7. In combination, a driving member, a driven member, several gears comprising a series of gear ratios and each having clutch teeth, one of said members having helical means, a toothed clutch member thereon having screw-shift coaction with said gears responsive to relative acceleration of said driven member for up-shift and to relative deceleration thereof for down-shift, a locking ring on said one member, said clutch member and ring having cooperating locking jaws formed so that the ring follows an up-shift upon its completion but moves in anticipation of a down-shift, a coupling loadable to effect said relative acceleration of said driving and driven members, control means adapted to urge respective movements of said ring and to simultaneously start the loading of said coupling, said control means being interconnected with said locking ring to unload said coupling responsively to said different ring movements.

8. In combination, a driving member, a driven member, selectively engageable gears adapted to provide a plurality of drive ratios between said members, a normally unloaded coupling having control means operable to load said coupling to relieve the engaged gear of drive for shifting, screw-shift gear engaging means adapted to disengage responsively to said relief and to engage a higher or lower ratio responsively to speed synchronization therewith by said coupling, said control including means to unload said coupling responsively to said relief in the case of a shift to lower ratio and responsively to said synchronization in the case of a shift to higher ratio.

9. A transmission including in combination several coaxial gears having engageable clutch teeth, gearing means driving respective gears at several relative speeds, a driven shaft having helical means, a gear-engaging clutch member mounted thereon for screw-shift disengagement of respective gears responsive to relief of driving load therefrom and engageable with gears of higher and lower speeds responsively to synchronization of said shaft speed therewith, a normally unloaded slip-coupling loadable to drive said shaft to effect said relief and synchronizations, and control means movable in high and low speed directions at will and organized to initiate loading of said coupling in either case and including means to unload said coupling in response to said relief in the case of a down-shift but in response to said synchronization in the case of an up-shift.

10. In combination, a driving shaft, a driven shaft, a normally unloaded loadable slip-coupling and a gear shift transmission both adapted to transmit driving torque between said shafts, said transmission providing low intermediate and high speeds, means responsive to relief of torque and to speed synchronization to respectively disengage and engage said speeds, and control means movable to a lower speed position in the first case and to a higher speed position in the second case and including means to initiate loading of said coupling in both cases and to unload said coupling responsive to said disengagement in the first case but to said synchronization in the second case.

11. In combination, a gear shift transmission affording several ratios of torque and speed and shiftable out of any ratio responsive to relief of torque and into a higher or lower ratio responsive to speed synchronization therewith, a normally unloaded coupling loadable to effect said torque relief, and a control to load said coupling and including means to unload the same responsively to said relief or syncronization respectively according as the shift is to lower or to higher speed.

12. In a transmission, a drive transmitting member, a plurality of gears comprising a series of speed ratios, means controllable to produce speed synchronization between said member and any selected gear, gear engaging means having screw shift coaction up and down said drive member and equipped with locking jaws, a locking member having coacting jaws so formed that the locking member is slidable in a down-shift direction along the drive member in anticipation of a down-shift but slidable in an up-shift direction along the drive member only on completion of an up-shift, and a control for said synchronizing means connected to said locking member to be responsive to shifting movements thereof.

13. In a multi-speed transmission, a drive transmitting member, multi-ratio gear drive means, a gear engaging ring having screw shift action along said shaft, said ring being adapted to shift out of an existing gear drive ratio when the driving torque becomes substantially zero and to shift into a desired gear drive ratio upon speed synchronization therewith, a locking member splined to said drive member and axially shiftable therealong, said locking member and ring having cooperating jaws to provide a driving connection between said ring and drive member, said jaws being so formed that the locking member is slidably movable in a down-shift direction along the drive member at the start of a down-shift and in the other direction only after the completion of an up-shift, and selective shift control means operative to effect relief of the driving torque of said gear means, and responsive to said locking member movements to restore driving torque to said gear means.

14. In a multi-speed transmission for an engine, stepped variable ratio gear drive means, a drive transmitting member, a gear engaging ring having screw shift action along said member, said ring being adapted to shift out of an existing gear drive ratio when the gear driving torque becomes substantially zero and to shift into a desired gear drive ratio upon speed synchronization therewith, a locking member splined to said drive member and axially shiftable therealong, said locking member and ring having cooperating jaws to provide a driving connection therethrough to said shaft, said jaws being so formed that the locking member is slidably movable in a down-shift direction along the shaft at the start of a down-shift and movable in the up-shift direction only after the completion of an up-shift, and selective shift control means operative to reduce the engine driving power and relieve said gear means of its driving torque and responsive to said locking member movements to restore engine driving power and driving torque to said gear means.

15. In a transmission, a shaft having a set of helical splines inclined to another set of splines, a first member having clutch teeth and slidable along one of said sets of splines, a second member slidable along the other set of splines, said members having cooperating jaws capable of locking said members at spaced stations along said shaft defining increments through which one of said members, depending on the direction of the shift, must first be shifted before the other member may follow-up said shift, a plurality of axially spaced gears affording different speed drive ratios and each provided with similar clutch teeth engageable by the clutch teeth of said first member at said stations upon speed synchronization therewith, and shift control means including a coupling loadable to effect said synchronization and operative to effect said sequential shifting of said members, said control including means responsive to the shifting operation to unload said coupling.

16. In a transmission, a drive member having axial splines and helical splines, a screw shift gear selector member and a locking member slidable on respective splines and having jaws with axial faces engageable against relative rotation in one direction and helical backs conformed to said helical splines for relative screw shift of said selector member away from said locking member which is prevented from following-up said screw shift until the jaws pass their point-to-point relationship thereby defining a screw shift increment, gears affording several speeds serially engageable by said selector member, a coupling loadable to synchronize said drive member with any of said gears, and automatic means for unloading said coupling when said locking member follows-up the resulting screw shift increment.

17. In a transmission between a pair of shafts, a screw shift gear selector member and a locking member having jaws engageable against relative rotation in one direction and permitting helical screw-shift separation in the other direction, one of said shafts having helical splines and axial splines on which said selector and locking members are respectively slidable whereby the locking member can follow-up said separation only when the jaws reach a point-to-point relation, a coupling loadable to drivably connect said shafts, and means to unload said coupling when said follow-up occurs.

18. In a transmission, a driving shaft, a driven shaft, one of said shafts having two sets of splines helically inclined relative to each other, a coupling loadable to drivably connect said shafts, a screw-shift selector member mounted on one set of splines and a locking member mounted on the other set of splines, said members having cooperating serrations defining screw-shift increments and conformed to respective splines whereby the first said member may screw-shift one increment from the other before the latter is able to follow-up said shift, and control means responsive to said follow-up to unload said coupling.

19. In a transmission between a pair of shafts, screw-shift and locking members including cooperating serrations having driving faces and sloping backs defining screw-shift increments, one of said shafts having two sets of splines mounting respective members and respectively conformed to said faces and backs whereby the locking member while incapable of shifting said screw-shift member may be separated therefrom in one direction but is prevented from following-up screw-shift of said member in the other direction until the shift increment is complete, a coupling loadable to drivably connect said shafts, and control means for said coupling responsive to said separation and follow-up.

20. In a transmission, a driving shaft, a driven shaft, members mounted respectively for movement axially and helically of one of said shafts and having engageable faces conformed to respective movements to comprise separable driving serrations defining shift increments through which either member must shift before the other may follow-up said shift, and coupling means connected between said shafts organized for decoupling responsively to the shift and follow-up motions of one of said members.

21. In a multi-speed transmission for an engine, a drive shaft, a pair of members having axial and helical coaction both with said shaft and mutually with each other thereby defining gear shift increments through which either member must be shifted before the other is able to follow-up said shift, a plurality of gears affording different speed drive ratios and each provided with clutch teeth spaced in accordance with said shift increments and selectively engageable by one of said members upon speed synchronization therewith, and gear shift control means operative to effect a decrease in engine power to initiate a shift, said control including means responsive to the resulting gear shift operation to restore engine power.

22. A transmission affording variable driving ratios from a source of power comprising in combination, a drive shaft, members having axial and helical coaction respectively with said shaft and mutually with each other defining increments through which either member must be shifted before the other is able to follow-up the shift, a plurality of gears affording different drive ratios and having an axial spacing corresponding to said shift increments, means for automatically effecting engagement of one of said members with said gears upon speed synchronization therewith, and control means operative to deenergize said source of power to initiate a shift and including means responsive to said shift operation to reenergize said source of power.

23. In a transmission, a shaft having a set of helical splines inclined to another set of splines, a gear shift selector member having clutch teeth and slidable along one of said sets of splines, a locking member slidable along the other set of splines, said members having cooperating jaws capable of locking said members at spaced stations along said shaft, thereby defining increments through which one of said members, depending on the direction of the shift, must be shifted before the other member may follow-up said shift, a plurality of gears having an axial spacing corresponding to said spaced stations and affording different speed drive ratios, each of said gears being provided with similar clutch teeth engageable by the clutch teeth of said gear shift selector member, and control means operable to effect relief of the gear driving torque to initiate a shift, said control including means responsive to shift and follow-up movements of said locking member to restore said gear driving torque.

24. In a gear shift transmission, a drive shaft, a pair of members having axial and helical coaction respectively with the shaft and mutually with each other thereby defining increments through which either member must be shifted before the other may follow-up said shift, a plurality of gears having an axial spacing corresponding to said shift increments, and means automatically operative for effecting engagement of one of said members with any one of said gears upon speed synchronization therewith.

25. In a transmission, driving and driven members, one of said members having helical splines, a plurality of gears each having clutch teeth, a toothed clutch member slidable on said helical splines into engagement with any one of said gears to provide a plurality of drive ratios between said driving and driven members, means including said helical splines for automatically shifting said clutch member from engagement with any of said gears upon relief of the gear drive torque and to shift said clutch member into engagement with another of said gears upon speed synchronism therewith, a normally disengaged coupling engageable to effect said torque relief and synchronization, and means automatically responsive to the resulting shift for effecting disengagement of said coupling upon initiation of the shift in the case of a down-shift and upon completion of the shift in the case of an up-shift.

26. In a transmission between a pair of shafts, a pair of clutch members having axial and helical co-action respectively with one of said shafts and mutually with each other thereby defining increments through which one of said clutch members must be shifted before the other is able to follow up said shift, a plurality of gears having an axial spacing corresponding to said increments and having different relative speeds, means for automatically moving one of said clutch members into engagement with any one of said gears upon speed synchronization therewith, and means controllable to effect said synchronization and including means elastically yieldable to urge the other of said members in a direction corresponding to the direction of the shift.

27. In a transmission, a driving member, a driven member, a plurality of axially spaced gears each affording a different speed ratio between said drive members, one of said members having helical and axial splines, a clutch member slidable along said helical splines for engagement with any one of said gears in response to relative acceleration and deceleration of said members, a locking member slidable along said axial splines, said clutch and locking members having mutually engageable jaws such that said locking member is adapted to lock said clutch member at spaced stations along said shaft corresponding to the spacing of said gears and such that in the case of a down-shift the locking member must be shifted before the clutch member can follow up said shift and in the case of an up-shift the clutch member must shift before the locking member can follow up said shift, and means controllable to effect said relative acceleration and deceleration, said means including a member movable from a first position to a second position for initiating said relative acceleration and deceleration and including resilient means for urging said locking member to its locking position for the gear to be engaged, said resilient means restoring said movable member to its first position in response to shift movement of said locking member.

28. In a transmission, driving and driven members, a multi-speed gear set affording a plurality of speed ratios between said members, means to automatically effect a shift out of an existing gear drive ratio when the gear drive torque becomes substantially zero and to shift into a new gear drive ratio upon speed synchronism therewith, a normally disengaged slip coupling controllably engageable to reduce its slip and provide a drive between said members in lieu of said gear set to effect said torque relief and synchronization, and means responsive to the shift for effecting disengagement of said coupling upon initiation of the shift in the case of a down-shift and upon completion of the shift in the case of an up-shift.

29. In a transmission, a driving member, a driven member, a toothed clutch member, a plurality of gears each having clutch teeth and each affording a different speed ratio between said driving and driven members upon engagement by said toothed clutch member, a normally unloaded coupling loadable to provide a drive between said driving and driven members in lieu of said gears, said coupling comprising adjacent and co-axially rotatable driving and driven coupling elements arranged for relative slip and loadable for reducing the magnitude of said slip, means to intiate loading of said coupling to effect speed synchronism of said clutch member with any one of said gears, means for automatically effecting a shift of said clutch member into engagement with any one of said gears upon enforcement of speed synchronism therewith by said coupling, and means responsive to the shift to unload said coupling upon initiation of the shift in the case of a down-shift and upon completion of the shift in the case of an up-shift.

30. In a transmission, a driving member, a driven member, clutch means, a plurality of gears each affording a different speed ratio between said members upon engagement by said clutch means, a normally unloaded coupling loadable to provide a drive between said driving and driven members in lieu of said gears, said coupling comprising a fluid coupling having driving and driven elements defining an annular space therebetween, means to initiate filling of said annular space with a fluid for loading said coupling for effecting speed synchronism of said clutch means with any one of said gears, means to automatically effect a shift of said clutch means into engagement with a gear in response to enforcement of speed synchronism therewith by said coupling, and means responsive to the shift to unload said coupling upon initiation of the shift in the case of a down-shift and upon completion of the shift in the case of an up-shift.

31. In a transmission, co-axial driving and driven shafts, three or more ring gears co-axial therewith and nested in side-by-side relation, said ring gears having similar clutch teeth, a toothed clutch member slidable along one of said shafts for engagement with the clutch teeth of any one of said ring gears, a plurality of layshafts circumferentially spaced about the axis of said shafts, means drivably connecting said layshafts to the other of said shafts, and a plurality of gears disposed in side-by-side relation on each of said layshafts, each of said ring gears having gear teeth in mesh with one of the gears on each of said layshafts.

32. In combination, a shaft having a set of helical splines inclined relative to another set of splines, a first member having clutch teeth and slidable along one of said sets of splines, a second member slidable along the other set of splines, said members having cooperating jaws capable of locking said members at spaced stations along said shaft thereby defining increments through which one of said members, depending on the direction of the shift, must first be shifted before the other member may follow up said shift, and a plurality of axially spaced gears affording different speed drive ratios and each provided with similar clutch teeth engageable by said first member at said stations.

33. In combination, a driving member, a driven member, a plurality of gears having clutch teeth arranged side-by-side about one of said members, toothed clutch means slidably mounted on said one member for selective engagement with the clutch teeth of said gears to provide different speed-ratio driving connections between said members, means for automatically effecting sliding movements of said clutch means along said one member in an up-shift direction in response to acceleration of said driven member relative to said driving member and in a down-shift direction in response to deceleration of said driven member relative to said driving member for engagement of said clutch means with any one of said gears upon speed synchronization therewith, a normally disengaged coupling engageable to drive said driven member in lieu of said gears for relatively accelerating or decelerating said driving and driven members to effect a desired gear shift, means to initiate engagement of said coupling, and automatic means responsive to the resulting shift to effect disengagement of said coupling.

34. In a transmission, driving and driven members, a plurality of gears, a toothed clutch member engageable with said gears to provide different speed-ratio driving connections between said driving and driven members, means automatically operative when a speed-ratio shift is initiated to move said clutch member from engagement with one of said gears when the torque therebetween is substantially zero and to move said clutch member into engagement with another of said gears upon speed synchronism therewith, and a normally disengaged coupling engageable to relieve said gears of torque to start a desired speed-ratio shift, and means automatically operative at the start of a down-shift but only after completion of an up-shift to effect disengagement of said coupling.

35. In a transmission, driving and driven members, a plurality of gears each having clutch teeth, a toothed clutch member engageable with the clutch teeth of said gears to provide different speed-ratio driving connections between said driving and driven members, a single member operable to initiate a speed-ratio change, means automatically operative upon operation of said single member to effect movement of said clutch member out from engagement with one of said gears when the torque therebetween becomes substantially zero and to effect movement of said clutch member into engagement with another of said gears upon speed synchronism therewith, and a normally unloaded slip coupling automatically loaded in response to operation of said single member to reduce its slip and provide a drive between said driving and driven members in lieu of said gears to effect said torque relief and speed synchronism.

36. In a transmission, driving and driven members, a plurality of gears each having clutch teeth, a toothed clutch member engageable with the clutch teeth of said gears to provide different speed-ratio driving connections between said driving and driven members, a single member operable to intiate a speed-ratio change, means automatically operative upon operation of said single member to effect movement of said clutch member out from engagement with one of said gears when the torque therebetween becomes substantially zero and to effect movement of said clutch member into engagement with another of said gears upon speed synchronism therewith, a normally unloaded slip coupling automatically loaded in response to operation of said single member to reduce its slip and provide a drive between said driving and driven members in lieu of said gears to effect said torque relief and speed synchronism, and means automatically operative at the start of a down-shift but only after completion of the up-shift to effect disengagement of said coupling.

37. In a transmission, driving and driven members, a plurality of side-by-side co-axial gears having similar clutch teeth, a clutch member having a single set of clutch teeth engageable with the clutch teeth of said gears to provide different speed-ratio driving connections between said driving and driven members, a single member operable for initiating a speed-ratio change, means automatically operative upon operation of said single member to effect movement of said clutch member out from engagement with one of said gears when the torque therebetween becomes substantially zero and to effect movement of said clutch member into engagement with another of said gears upon speed synchronism therewith, a normally unloaded slip coupling automatically loaded in response to said initiation to reduce its rate of slip and provide a drive between said driving and driven members in lieu of said gears to effect said torque relief and speed synchronism, and means automatically operative at the start of a down-shift but only after completion of the up-shift to effect disengagement of said coupling.

38. In a transmission, driving and driven members, one of said members having helical splines, a plurality of gears having clutch teeth, toothed clutch means slidable on said splines for selective engagement with said gears to provide different speed-ratio driving connections between said members, means including said helical splines for automatically shifting said clutch means out from engagement with any of said gears when the torque therebetween becomes substantially zero and for automatically shifting said clutch means into engagement with another of said gears upon speed synchronism therewith, a normally unloaded coupling loadable to provide a drive between said members in lieu of said gears to effect said torque relief and speed synchronism, and means automatically responsive to the resulting speed-ratio change for unloading said coupling.

39. In a transmission for an engine, a drive shaft adapted to be drivably connected to said engine, a driven shaft, a plurality of gears connected to one of said shafts and having clutch teeth, toothed clutch means connected to the other of said shafts and selectively engageable with the clutch teeth of said gears to provide different speed-ratio driving connections between said shafts, a control member having a plurality of speed-ratio positions and movable from one speed-ratio position to another to initiate a speed-ratio change, means automatically operative upon speed-ratio-change movement of said control member to move said clutch means out from engagement with the clutch teeth of one of said gears when the torque therebetween becomes substantially zero and to move said clutch means into engagement with the clutch teeth of another of said gears upon speed synchronism therewith, and means operative in response to said control member movement, while said drive shaft is drivably connected to said engine and transmission, to reduce the power of said engine to effect said torque relief and synchronism and to automatically restore said engine power at the start of the shift in the case of a down-shift but only after completion of the shift in the case of an up-shift.

40. In a transmission for an engine, a drive shaft adapted to be drivably connected to said engine, a driven shaft, three or more co-axial gears connected to one of said shafts and having similar clutch teeth, a clutch member connected to the other of said shafts and having a set of clutch teeth selectively engageable with the clutch teeth of said gears to provide three or more speed-ratio driving connections between said shafts, a control member having a plurality of speed ratio positions and movable from one speed-ratio position to another to initiate a speed-ratio change, means automatically operative upon speed-ratio-change movement of said control member to move said clutch member out from engagement with the clutch teeth of one of said gears when the torque therebetween becomes substantially zero and to move said clutch member into engagement with the clutch teeth of another of said gears upon speed synchronism therewith, and means operative in response to said control member movement, while said drive shaft is drivably connected to said engine and transmission, to effect said torque relief and synchronism and to automatically restore said torque in response to the resulting speed-ratio change.

41. In a multi-speed transmission, a driving member, a driven member, a plurality of gears, shiftable means having teeth selectively engageable with said gears to provide different speed-ratio driving connections between said members, means for effecting a speed-ratio change movement of said shiftable means including a normally disengaged slip coupling engageable to reduce its slip and provide a driving connection between said members in parallel with said first-mentioned driving connections, and means automatically operative at the start of a down-shift but only after completion of an up-shift to effect disengagement of said coupling.

42. In a multi-speed transmission, a driving member, a driven member, three or more co-axial gears disposed in side-by-side relation and each having similar clutch teeth, a toothed clutch member having a single set of clutch teeth selectively engageable with the clutch teeth of said gears to provide different speed-ratio driving connections between said driving and driven members, means for effecting a speed-ratio change movement of said shiftable means including a normally disengaged slip coupling engageable to reduce its slip and provide a driving connection between said members in parallel with said first-mentioned driving connections, and means automatically responsive to the speed-ratio change for effecting disengagement of said coupling.

43. In a transmission for an engine, a drive shaft adapted to be drivably connected to said engine, a driven shaft, a plurality of gears connected to one of said shafts and having clutch teeth, toothed clutch means connected to the other of said shafts and having a single set of clutch teeth selectively engageable with the clutch teeth of said gears to provide different speed-ratio driving connections between said shafts, a control member having a plurality of speed-ratio positions and movable from one speed-ratio position to another to initiate a speed-ratio change, means automatically operative upon speed-ratio-change movement of said control member to move said clutch means out from engagement with the clutch teeth of one of said gears when the torque therebetween becomes substantially zero and to move said clutch means into engagement with the clutch teeth of another of said gears upon speed synchronism therewith, and means operative in response to said control member movement, while said drive shaft is drivably connected to said engine and transmission, to reduce the power of said engine to effect said torque relief and synchronism and to automatically restore said engine power at the start of the shift in the case of a down-shift but only after completion of the shift in the case of an up-shift.

44. In combination, a driving member, a driven member, a plurality of gears having clutch teeth arranged side-by-side about one of said members, toothed clutch means slidably mounted on said one member for selective engagement with the clutch teeth of said gears to provide different speed-ratio driving connections between said members, means for automatically effecting sliding movement of said toothed clutch means in one or the other direction along said one member in response respectively to acceleration or deceleration of said driven member relative to said driving member for engagement of said toothed clutch means with any one of said gears upon speed synchronization therewith, a normally disengaged coupling engageable to drive said driven member in lieu of said gears for relatively accelerating or decelerating said driving and driven members to effect a desired gear shift, and automatic means responsive to the resulting shift to effect disengagement of said coupling.

ROLAND CHILTON.